(12) United States Patent
Kishi et al.

(10) Patent No.: US 9,365,253 B2
(45) Date of Patent: Jun. 14, 2016

(54) REAR PORTION STRUCTURE OF VEHICLE

(71) Applicant: HONDA MOTOR CO., LTD., Tokyo (JP)

(72) Inventors: Toshiaki Kishi, Wako (JP); Martin Petersson, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 287 days.

(21) Appl. No.: 14/199,218

(22) Filed: Mar. 6, 2014

(65) Prior Publication Data

US 2014/0263506 A1 Sep. 18, 2014

(30) Foreign Application Priority Data

Mar. 13, 2013 (JP) ................................. 2013-050942

(51) Int. Cl.
*B62J 9/00* (2006.01)
*B62J 1/28* (2006.01)
*B62J 25/00* (2006.01)

(52) U.S. Cl.
CPC ...... *B62J 1/28* (2013.01); *B62J 9/00* (2013.01); *B62J 9/001* (2013.01); *B62J 25/00* (2013.01)

(58) Field of Classification Search
CPC ................. B62J 1/28; B62J 9/00; B62J 9/001; B62J 25/00; B62J 7/04
See application file for complete search history.

(56) References Cited

U.S. PATENT DOCUMENTS

| | | | |
|---|---|---|---|
| 6,840,417 B2* | 1/2005 | Heinrich | B62J 9/00 224/413 |
| 2005/0150921 A1* | 7/2005 | Schneider | B62J 9/00 224/413 |
| 2007/0057484 A1* | 3/2007 | Gilman | B62J 25/00 280/291 |
| 2008/0238018 A1* | 10/2008 | Yoshizawa | B62J 25/00 280/166 |
| 2008/0238032 A1* | 10/2008 | Ishikawa | B62J 25/00 280/291 |
| 2010/0025443 A1* | 2/2010 | Racz | B62J 15/00 224/545 |
| 2011/0073627 A1* | 3/2011 | Iida | B62J 7/04 224/413 |
| 2014/0367432 A1* | 12/2014 | Tamura | B62J 9/001 224/413 |

FOREIGN PATENT DOCUMENTS

JP 2010-47164 A 3/2010

* cited by examiner

*Primary Examiner* — Corey Skurdal
(74) *Attorney, Agent, or Firm* — Westerman, Hattori, Daniels & Adrian, LLP

(57) ABSTRACT

A technology is provided which can enhance the appearance of a vehicle in terms of a rear portion structure of the vehicle wherein a saddle bag is provided removably. A motorcycle includes a rear fender which covers a rear wheel, a rear cowl which covers a rear portion of the vehicle, and a saddle bag removably attached to the rear cowl and the rear fender. In the motorcycle, saddle bag attachment holes are provided on the rear cowl and the rear fender. When the saddle bag is not mounted on the vehicle, the saddle bag attachment holes are covered with movable members. The movable members are a passenger step and a passenger grip.

15 Claims, 11 Drawing Sheets

(a)

(b)

REAR PORTION STRUCTURE OF VEHICLE

CROSS-REFERENCE TO RELATED APPLICATIONS

The present application claims priority under 35 U.S.C. §119 to Japanese Patent Application No. 2013-050942, filed Mar. 13, 2013, the contents of which is incorporated herein, by reference, in its entirety.

TECHNICAL FIELD

The present invention relates to improvements in or relating to a rear portion structure of a vehicle.

BACKGROUND OF THE INVENTION

A rear portion structure of a vehicle is known wherein a saddle bag is removably provided at a rear portion of a vehicle body (refer to, for example, Japanese Patent Laid-open No. 2010-47164 FIG. 14).

As shown in FIG. 14 of Japanese Patent Laid-open No. 2010-47164, at a rear portion of a motorcycle as a vehicle, a rear fender has saddle bag attachment holes provided thereon. When the vehicle is viewed in plan, the saddle bag attachment holes are provided below the rear fender, and the saddle bag attachment holes are provided below a rear lamp unit. In other words, the rear fender or the rear lamp unit is provided above the saddle bag attachment holes. Therefore, the saddle bag attachment holes are made less conspicuous. Even if the saddle bag is removed, the appearance of the vehicle is thus not impaired.

Incidentally, with the technique of Japanese Patent Laid-open No. 2010-47164, when the vehicle is viewed in top plan, the saddle bag attachment holes can be hidden. However, for example, when the vehicle is viewed from an obliquely upper position, they are exposed. Therefore, there is room for improvement in terms of the appearance.

SUMMARY OF THE INVENTION

A technology is provided which can enhance the appearance of a vehicle in terms of a rear portion structure of the vehicle in which a saddle bag is provided removably.

According to a first feature, there is provided a rear portion structure of a vehicle which includes a rear frame disposed at a rear portion of a vehicle body, a rear fender provided below the rear frame and configured to cover a rear wheel, a rear cowl provided on the sides of the rear frame and configured to cover the rear frame, an occupant seat provided above the rear fender such that a driver and a passenger can be seated forward and backward thereon, and saddle bags removably provided as storage compartments on the rear frame, rear cowl and/or rear fender, wherein saddle bag attachment holes are provided on the rear frame, rear cowl and/or rear fender and configured to attach the saddle bags thereto; claw portions are provided on the saddle bags and configured to engage with the saddle bag attachment holes to attach the saddle bags; when the saddle bags are not attached to the vehicle, the saddle bag attachment holes are covered with movable members provided on the vehicle; and the movable members are components of the vehicle body which have a function other than the function of covering the saddle bag attachment holes.

According to a second feature, the movable members include passenger steps on which the passenger is to place the feet thereof; the passenger steps are attached for pivotal motion to the rear frame; and when the passenger steps are retracted in the rear cowl, the passenger steps cover the saddle bag attachment holes.

According to a third feature, the passenger steps are configured from arm portions and foot receiving portions provided at ends of the arm portions such that the passenger is to place the feet thereof on the foot receiving portions; base portions of the arm portions are supported for pivotal motion on the rear frame; and when the passenger steps are retracted in the rear cowl, the foot receiving portions cover the saddle bag attachment holes.

According to a fourth feature, the movable members include passenger grips which can be gripped by the driver or the passenger; the passenger grips are provided at an upper location of the rear cowl for sliding movement between an upper position and a lower position; when the passenger grips are at the upper position, the saddle bag attachment holes are exposed; and when the passenger grips are at the lower position, the saddle bag attachment holes are covered with the passenger grips.

According to a fifth feature, the passenger grips configure part of the rear cowl; the direction in which the passenger grips slidably move from the lower position to the upper position is an outwardly obliquely upward direction in the vehicle widthwise direction; and when the passenger grips are at the upper position, the saddle bag attachment holes are exposed to the outer sides of the passenger grips.

According to a sixth feature, the saddle bag attachment holes are provided on the left and right sides of the rear fender individually at one place and are provided on the left and right sides of the rear cowl or the rear frame individually at two places; and the saddle bag attachment holes provided on the left and right sides of the rear cowl or the rear frame individually at two places are covered with the movable members.

According to a seventh feature, of the saddle bag attachment holes provided on the left and right sides of the rear cowl individually at two places, saddle bag attachment holes provided on at least one of the left and right sides are hidden by the occupant seat as viewed in top plan of the vehicle.

According to the first feature, the saddle bags are removably attached to the rear frame, rear cowl and/or rear fender. Further, when the saddle bags are not attached to the vehicle, the saddle bag attachment holes to which the saddle bags are attached are covered with the movable members. By covering the saddle bag attachment holes with the movable members when the saddle bags are not mounted, the saddle bag attachment holes are not exposed. As a result, the appearance of the vehicle can be enhanced.

Further, the movable members are components of the vehicle body which have other functions. Therefore, there is no necessity to provide a separate member for covering the saddle bag attachment holes. As a result, the number of parts can be reduced.

According to the second feature, the passenger steps serving as the movable members are attached for pivotal motion to the rear frame. When the passenger steps are retracted, the saddle bag attachment holes are covered with the passenger steps. Since, when the saddle bags are not mounted, the saddle bag attachment holes are covered with the passenger steps, the saddle bag attachment holes are not exposed. As a result, the appearance of the vehicle can be enhanced.

According to the third feature, the passenger steps have the foot receiving portions. When the passenger steps are retracted in the rear cowl, the saddle bag attachment holes are covered with the foot receiving portions of the passenger steps. Since the saddle bag attachment holes are covered with the foot receiving portions, the saddle bag attachment holes are not exposed. As a result, the appearance of the vehicle can be enhanced.

According to the fourth feature, the passenger grips which serve as the movable members are provided for sliding movement on the rear cowl. When the passenger grips are at the lower position, the saddle bag attachment holes are covered with the passenger grips. Since, when the saddle bags are not mounted, the saddle bag attachment holes are covered with the passenger grips, the saddle bag attachment holes are not exposed. As a result, the appearance of the vehicle can be enhanced.

According to the fifth feature, the passenger grips configure part of the rear cowl. In other words, part of the rear cowl is employed as the passenger grips. Therefore, the number of parts can be reduced.

Further, when the passenger grips are at the upper position to which they are slidably moved in an outwardly obliquely upward direction in the vehicle widthwise direction, the saddle bag attachment holes are exposed to the outer sides of the passenger grips. Since the saddle bag attachment holes are positioned outwardly of the passenger grips, an operation for attaching the saddle bags can be carried out readily.

According to the sixth feature, the saddle bag attachment holes provided on the left and right sides of the rear cowl or the rear frame individually at two places are covered with the movable members. Since at least the saddle bag attachment holes on the left and right sides individually at two places are covered with the movable members, the number of those saddle bag attachment holes which are covered increases. As a result, the appearance of the vehicle is enhanced furthermore.

According to the seventh feature, the saddle bag attachment holes provided on at least one of the left and right sides are hidden by the occupant seat as viewed in top plan of the vehicle. Since part of the saddle bag attachment holes are hidden by the occupant seat, the appearance of the vehicle can be enhanced further.

BRIEF DESCRIPTION OF THE DRAWINGS

The advantages of the invention will become apparent in the following description taken in conjunction with the drawings, wherein.

DETAILED DESCRIPTION OF THE INVENTION

In the following, an embodiment of the present invention is described in detail. In the figures and the embodiment, "up," "down," "front," "rear," "left" and "right" indicate directions as viewed from a rider who rides on a motorcycle.

A working example of the present invention is described with reference to the drawings.

Figure 1:
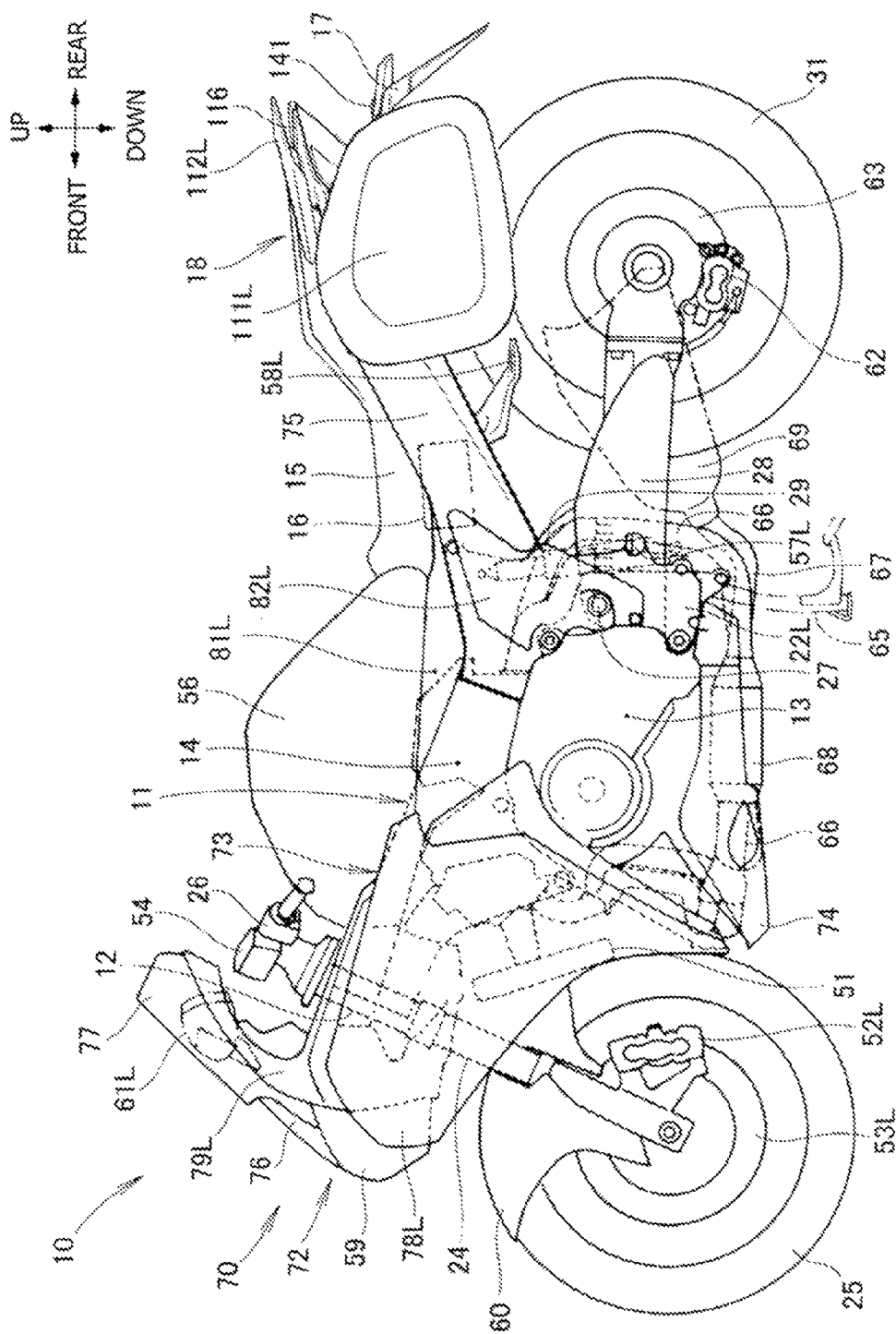
FIG. 1 is a left side elevational view of a motorcycle according to the present invention.

As shown in FIG. 1, a motorcycle 10 as a vehicle includes a vehicle body frame 11. The vehicle body frame 11 is configured from a head pipe 12, a main frame 14, and a rear frame 19 (refer to FIG. 4). The main frame 14 extends rearwardly from the head pipe 12 and supports an engine 13 thereon. The rear frame 19 extends rearwardly from an upper portion of a rear end of the main frame 14 and supports an occupant seat 15 thereon. Further, the rear frame 19 has an electric part such as a battery 16 attached thereto and supports thereon a vehicle body rear portion 18 including a rear fender 17. The main frame 14 includes pivot plates 22L and 22R (only reference symbol 22L on this side is shown, which similarly applies to the following description) which are provided at a rear end portion of the main frame 14. The pivot plates 22L and 22R support a swing arm 28 thereon.

A pivot shaft 27 is provided on the pivot plates 22L and 22R, and the rear swing arm 28 extends rearwardly from the pivot shaft 27. A rear cushion unit 29 for absorbing a shock is provided between the swing arm 28 and the main frame 14. A rear wheel 31 is attached to an end portion of the swing arm 28. The rear wheel 31 is driven by, for example, a drive shaft (not shown) which connects the engine 13 and the rear wheel 31 to each other.

A front fork 24 is provided on the head pipe 12, and a front wheel 25 is attached to a lower end portion of the front fork 24. A steering handlebar 26 for steering the front wheel 25 is provided at an upper end portion of the front fork 24.

The engine 13 (for example, a V-type four-cylinder engine) is mounted on the main frame 14. The engine 13 is supported by the main frame 14 and the pivot plates 22L and 22R. An exhaust pipe 66 extends from each cylinder of the engine 13, and the exhaust pipes 66 are connected to a catalyst tube 68. A collection exhaust pipe 67 extends in the vehicle rear direction from the catalyst tube 68 and is connected at an extremity thereof to a front end of a silencer 69. The silencer 69 extends rearwardly from the front to the rear of the vehicle.

In FIG. 1, reference symbol 51 denotes a radiator unit for cooling the engine 13, and reference symbols 52L and 52R (only the reference symbol 52L on this side is shown, which similarly applies also in the following description) denote front disk brake calipers provided on the front fork 24. Reference symbols 53L and 53R (only the reference symbol 53L on this side is shown, which similarly applies also in the following description) denote front disk plates provided for the front wheel 25 and sandwiched by the front disk brake calipers 52L and 52R. Reference symbol 54 denotes a front master cylinder provided on the steering handlebar 26, and reference symbol 56 denotes a fuel tank cover which covers a fuel tank attached to the main frame 14. Reference symbols 57L and 57R (only the reference symbol 57L on this side is shown, which similarly applies also in the following description) denote rider's steps attached to the main frame 14. Reference symbols 58L and 58R (only the reference symbol 58L on this side is shown, which similarly applies also in the following description) denote passenger steps attached to the rear frame 19. Reference symbol 59 denotes a headlamp, reference symbol 60 denotes a front fender, and reference symbols 61L and 61R (only the reference symbol 61L on this side is shown, which similarly applies also in the following description) denote mirrors. Reference symbol 62 denotes a rear disk brake caliper, reference symbol 63 denotes a rear disk plate provided on the rear wheel 31 and sandwiched by the rear disk brake caliper 62, reference symbol 65 denotes a main stand, and reference symbol 116 denotes a rear lamp unit.

In the following, the cowl unit 70 which principally configures an outward appearance part of the motorcycle 10 is described.

The cowl unit 70 includes a front cowl 72, a side cowl 73, an under cowl 74 and a rear cowl 75 and is provided for the object of protection from the wind, improvement in the outward appearance of the vehicle and so forth. The front cowl 72 covers the front of the vehicle body frame 11. The side cowl 73 is provided continuously with the front cowl 72 and covers the sides of the vehicle. The under cowl 74 is provided below the engine 13. The rear cowl 75 covers a rear portion of the vehicle behind and above the under cowl 74.

The front cowl 72 includes a upper center cowl 76, a windshield 77, and part of front upper side cowls 79L and 79R (only the reference symbol 79L on this side is shown, which similarly applies also in the following description). The upper center cowl 76 covers the headlamp 59 from above. The windshield 77 extends upwardly from the upper center cowl 76. The front upper side cowls 79L and 79R have middle cowls 78L and 78R (only the reference symbol 78L on this side is shown, which similarly applies also in the following description) and support the left and the right of the windshield 77, respectively. The middle cowls 78L and 78R cover the sides of the main frame 14.

The side cowl 73 includes the front upper side cowls 79L and 79R, the middle cowls 78L and 78R, and knee covers 81L and 81R (only the reference symbol 81L on this side is shown, which similarly applies also in the following description). The side cowl 73 further includes pivot plate covers 82L and 82R (only the reference symbol 82L on this side is shown, which similarly applies also in the following description). The front upper side cowls 79L and 79R support the left and the right of the windshield 77, respectively. The middle cowls 78L and 78R cover the sides of the head pipe 12 and the main frame 14. The knee covers 81L and 81R cover the bottom of the fuel tank cover 56 and are sandwiched by the legs of the rider during driving. The pivot plate covers 82L and 82R are provided below the knee covers 81L and 81R and cover the outer side faces of the pivot plates 22L and 22R which are components of the main frame 14, respectively.

The rear cowl 75 covers the rear frame 19, which configures the vehicle body rear portion 18, from the outer sides. The rear fender 17 which covers the rear wheel 31 is provided below the rear frame 19, and the occupant seat 15 for being seated upon by an occupant is provided above the rear fender 17. Saddle bags 111L and 111R (only the reference symbol 111L on this side is shown) as storage compartments are attached to the rear cowl 75. Passenger grips 112 are provided on the rear frame 19 of the vehicle body rear portion 18 such that they can be grasped by an occupant.

It is to be noted that, although, in the present working example, the saddle bags are attached to the rear cowl 75, they may otherwise be attached to the rear frame. Alternatively, the saddle bags may be attached to the rear fender.

Now, saddle bag attachment holes provided on the reverse side of the saddle bags 111L and 111R on the vehicle rear portion are described.

Figure 2:
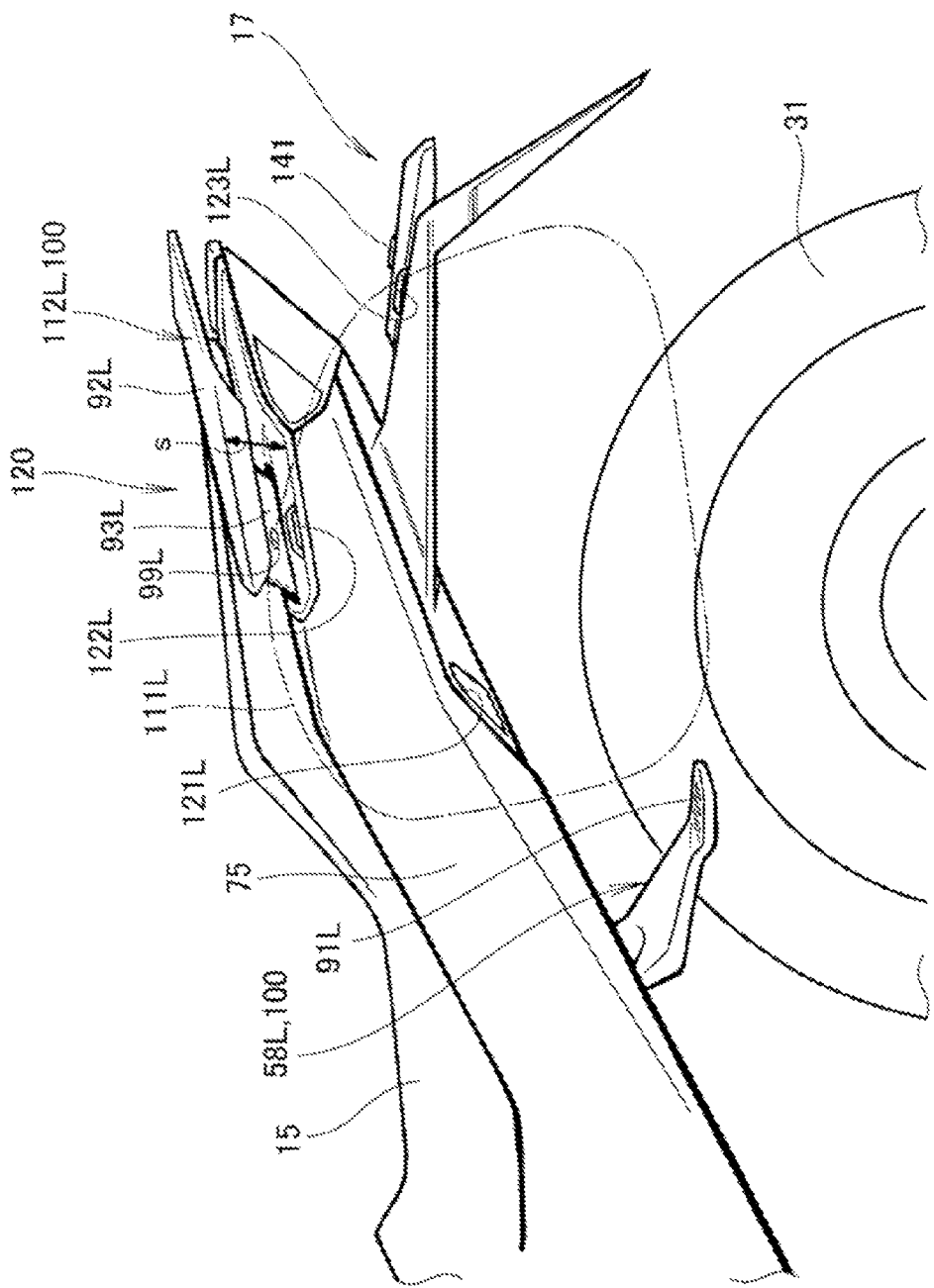
FIG. 2 is a partial enlarged view of FIG. 1, in a state in which a saddle bag can be mounted.

As shown in FIG. 2, on the vehicle rear portion, first saddle bag attachment holes 121L and 121R (only the reference symbol 121L on this side is shown, which similarly applies also in the following description) are provided on the rear cowl 75. Second saddle bag attachment holes 122L and 122R (only the reference symbol 122L on this side is shown, which similarly applies also in the following description) are provided on the rear cowl 75 at rear upper positions with respect to the first saddle bag attachment holes 121L and 121R, respectively. Further, third saddle bag attachment holes 123L and 123R (only the reference symbol 123L on this side is shown, which similarly applies also in the following description) are provided on the rear fender 17 at rear lower positions with respect to the second saddle bag attachment holes 122L and 122R, respectively.

At this time, the passenger steps 58L and 58R are not positioned at an upper position at which they are accommodated in the rear cowl 75 (accommodation portion). Foot receiving portions 91L and 91R (only the reference symbol 91L on this side is shown, which similarly applies also in the following description) of the passenger steps 58L and 58R are positioned at a lower position on which the passenger can place its feet (use position). Details are hereinafter described.

Passenger grips 112L and 112R (only the reference symbol 112L on this side is shown, which similarly applies also in the following description) are provided for upward and downward sliding movement as indicated by an arrow mark s in FIG. 2. The passenger grips 112L and 112R have gripping portions 92L and 92R (only the reference symbol 92L on this side is shown, which similarly applies also in the following description) and column portions 93L and 93R (only the reference symbol 93L on this side is shown, which similarly applies also in the following description). The gripping portions 92L and 92R can be grasped by the passenger. The column portions 93L and 93R support the gripping portions 92L and 92R, respectively.

In FIG. 2, the gripping portions 92L and 92R of the passenger grips 112L and 112R are shown at an upper position to which they are slidably moved upwardly. Luggage hanging hook attachment holes 99L and 99R (only the reference symbol 99L on this side is shown, which similarly applies also in the following description) are provided in the column portions 93L and 93R of the passenger grips 112L and 112R, respectively. The luggage hanging hook attachment holes 99L and 99R appear to the outside when the gripping portions 92L and 92R are positioned at the upper position.

It is to be noted that, although the first saddle bag attachment holes and the second saddle bag attachment holes in the present embodiment are provided in the rear cowl, they may otherwise be provided in the rear frame or the rear fender. Further, although the third saddle bag attachment holes are provided in the rear fender, they may otherwise be provided in the rear cowl or the rear frame.

Now, description is given that, when the saddle bags 111L and 111R are removed, the first saddle bag attachment holes 121L and 121R and the second saddle bag attachment holes 122L and 122R are covered with movable members 100.

Figure 3:
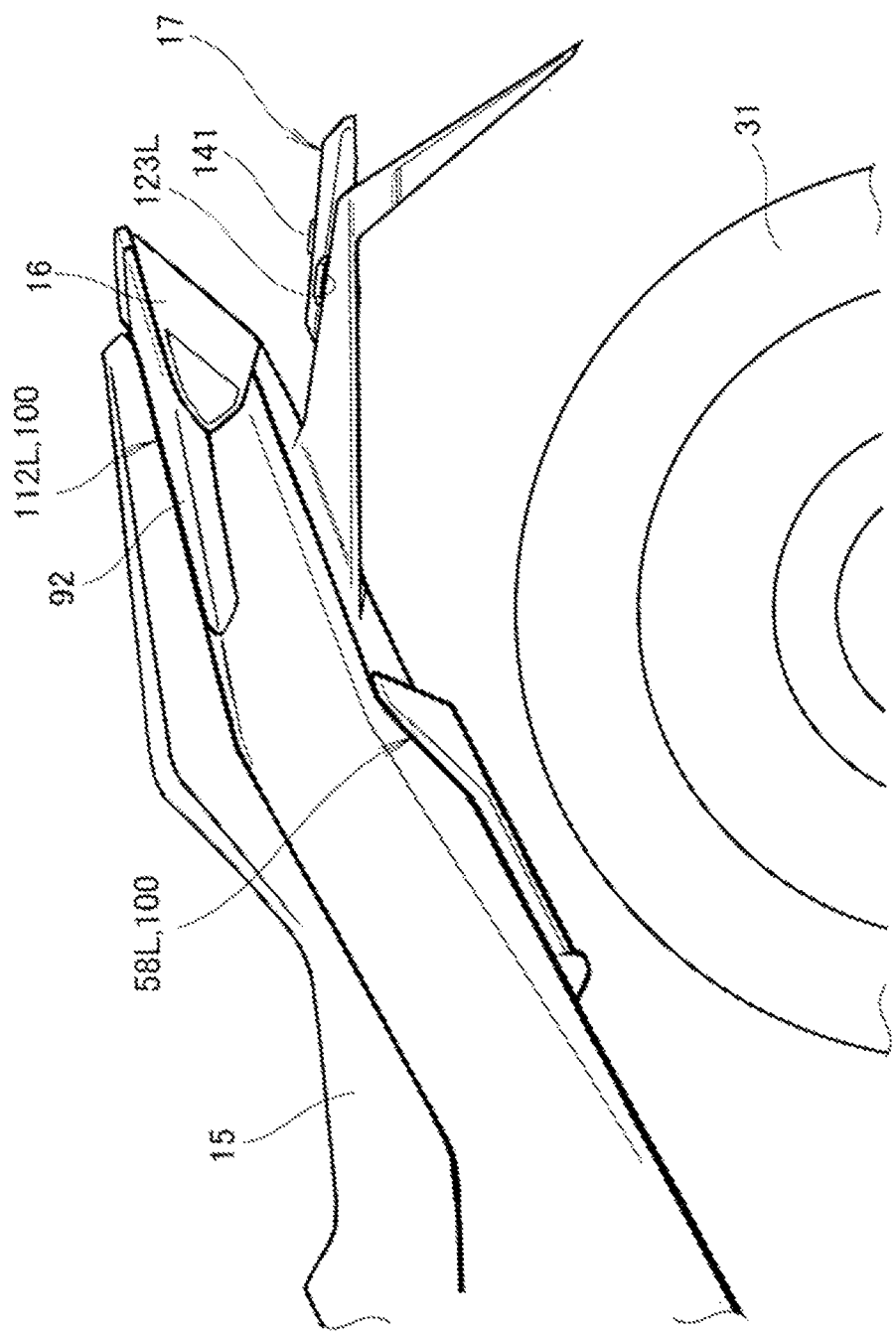
FIG. 3 is a side elevational view of a rear portion of the vehicle when the saddle bag is removed.

As shown in FIG. 3, the movable members 100 include the passenger steps 58L and 58R on which the passenger can place its feet. The passenger steps 58L and 58R are attached for pivotal motion to the rear frame 19 (refer to FIG. 4). When the passenger steps 58L and 58R are retracted in the rear cowl 75, they cover the first saddle bag attachment holes 121L and 121R (refer to FIG. 2), respectively. Details of the passenger steps 58L and 58R are hereinafter described.

The movable members 100 further include the passenger grips 112L and 112R which can be grasped by the rider or the passenger. The passenger grips 112L and 112R are provided for sliding movement between an upper position and a lower position at an upper portion of the rear cowl 75. As shown in FIG. 2, when the passenger grips 112L and 112R are at the upper position, the second saddle bag attachment holes 122L and 122R (only the reference symbol 122L on this side is shown, which similarly applies also in the following description) are exposed. When the passenger grips 112L and 112R are at the lower position, they cover the second saddle bag attachment holes 122L and 122R.

In particular, the passenger steps 58L and 58R and the passenger grips 112L and 112R as the movable members 100 are vehicle body components having a function in addition to the function of covering the first and second saddle bag attachment holes 121L, 121R, 122L and 122R. When the saddle bags 111L and 111R are not mounted on the vehicle, the first and second saddle bag attachment holes 121L, 121R, 122L and 122R are covered with the movable members 100.

Figure 4:
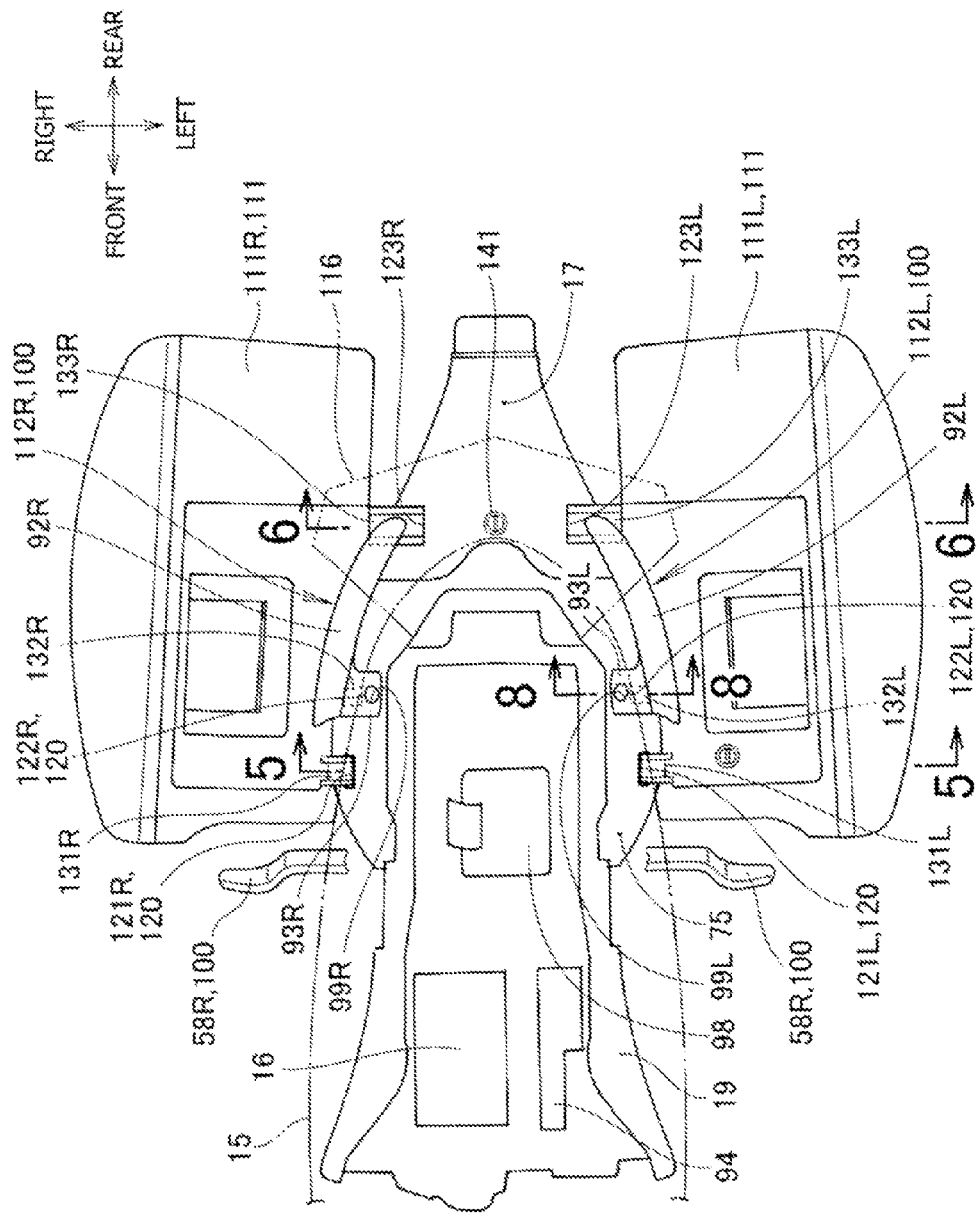
FIG. 4 is a partial top plan view of the motorcycle.

As shown in FIG. 4, when the rear portion of the vehicle is viewed from above, the rear cowl 75 is provided on the rear frame 19 in such a manner as to cover the sides of the rear frame 19, and the passenger grips 112L and 112R are attached to the rear cowl 75. The passenger grips 112L and 112R are members which configure part of the rear cowl 75. The rear cowl 75 has the left and right first saddle bag attachment holes 121L and 121R provided therein and has the left and right second saddle bag attachment holes 122L and 122R provided therein behind the left and right first saddle bag attachment holes 121L and 121R, respectively. Behind the left and right second saddle bag attachment holes 122L and 122R, the left and right third saddle bag attachment holes 123L and 123R are provided in the rear fender 17, respectively.

The saddle bags 111L and 111R have left and right first to third claw portions 131L to 133L and 131R to 133R which engage with the left and right first to third saddle bag attachment holes 121L to 123L and 121R to 123R to attach the saddle bags 111L and 111R, respectively. The left and right first and second saddle bag attachment holes 121L, 122L, 121R and 122R provided on the rear cowl 75 are hidden by the occupant seat 15 when the vehicle is viewed in plan.

Further, the luggage hanging hook attachment holes 99L and 99R provided on the column portions 93L and 93R of the passenger grips 112L and 112R can be visually recognized when the vehicle is viewed in plan. Therefore, when luggage hanging hooks are attached to the luggage hanging hook attachment holes 99L and 99R, they can be attached readily.

It is to be noted that the battery 16 is provided on the top face of the rear fender 17 and a relay fuse box 94 is provided on the left side of the battery 16 while a storage compartment 98 is provided behind the relay fuse box 94.

Now, a structure of the left and right first saddle bag attachment holes 121L and 121R and peripheral elements is described.

Figure 5:
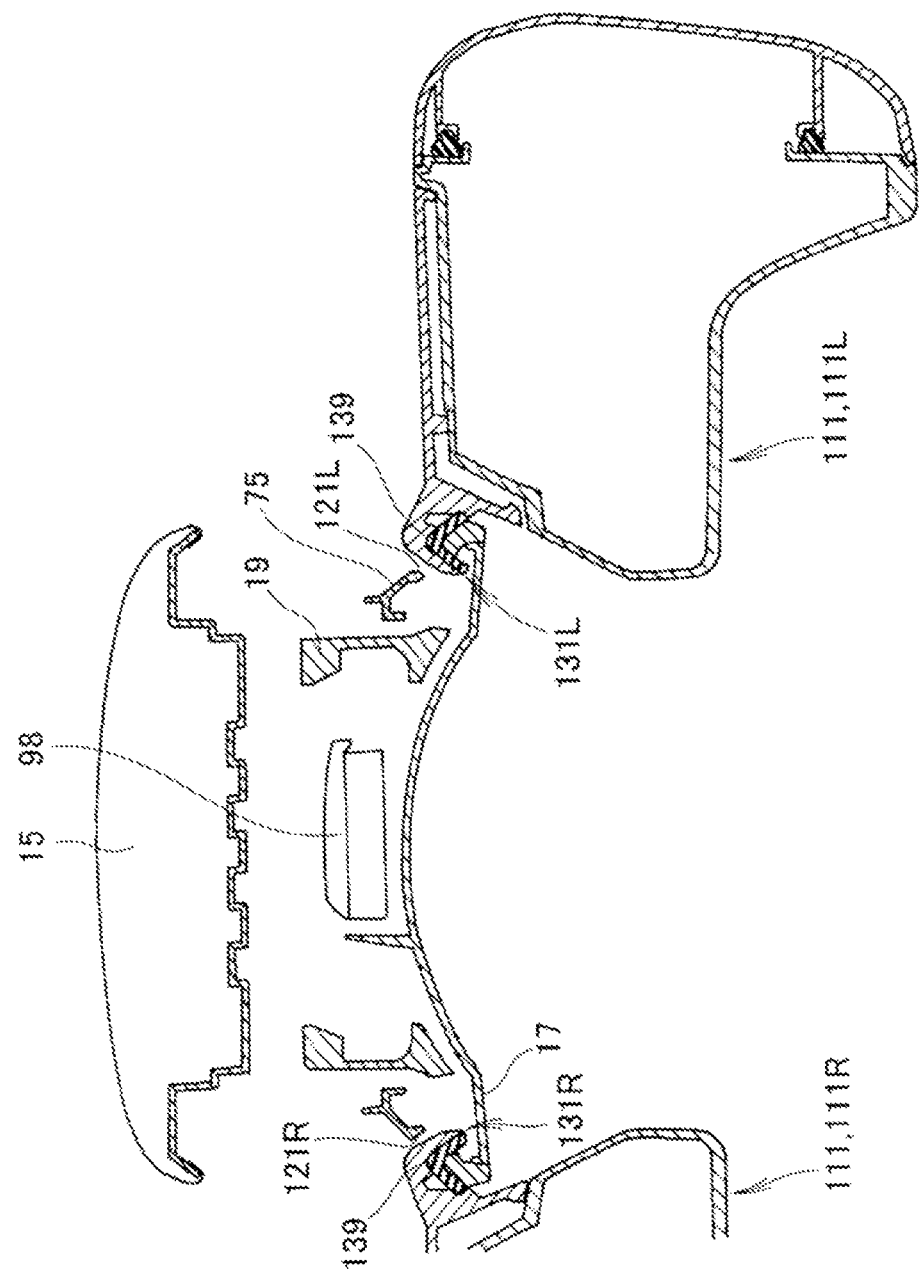
FIG. 5 is a sectional view taken along line 5-5 of FIG. 4.

As shown in FIG. 5, the rear cowl 75 is provided on the outer sides of the rear frame 19, and the rear fender 17 is disposed in such a manner as to extend between lower ends of the rear cowl 75. The occupant seat 15 is disposed above the rear frame 19. The left and right first saddle bag attachment holes 121L and 121R are provided on the rear cowl 75. The left and right first claw portions 131L and 131R provided on the left and right saddle bags 111L and 111R side are engaged with the left and right first saddle bag attachment holes 121L and 121R, respectively. At the engaging locations with the left and right first saddle bag attachment holes 121L and 121R, elastic members 139 for moderating vibration to be applied to the saddle bags 111L and 111R are provided on the left and right first claw portions 131L and 131R, respectively.

Now, a structure of the left and right third saddle bag attachment holes 123L and 123R provided on the rear fender 17 at the rear end of the vehicle and peripheral elements is described.

Figure 6:
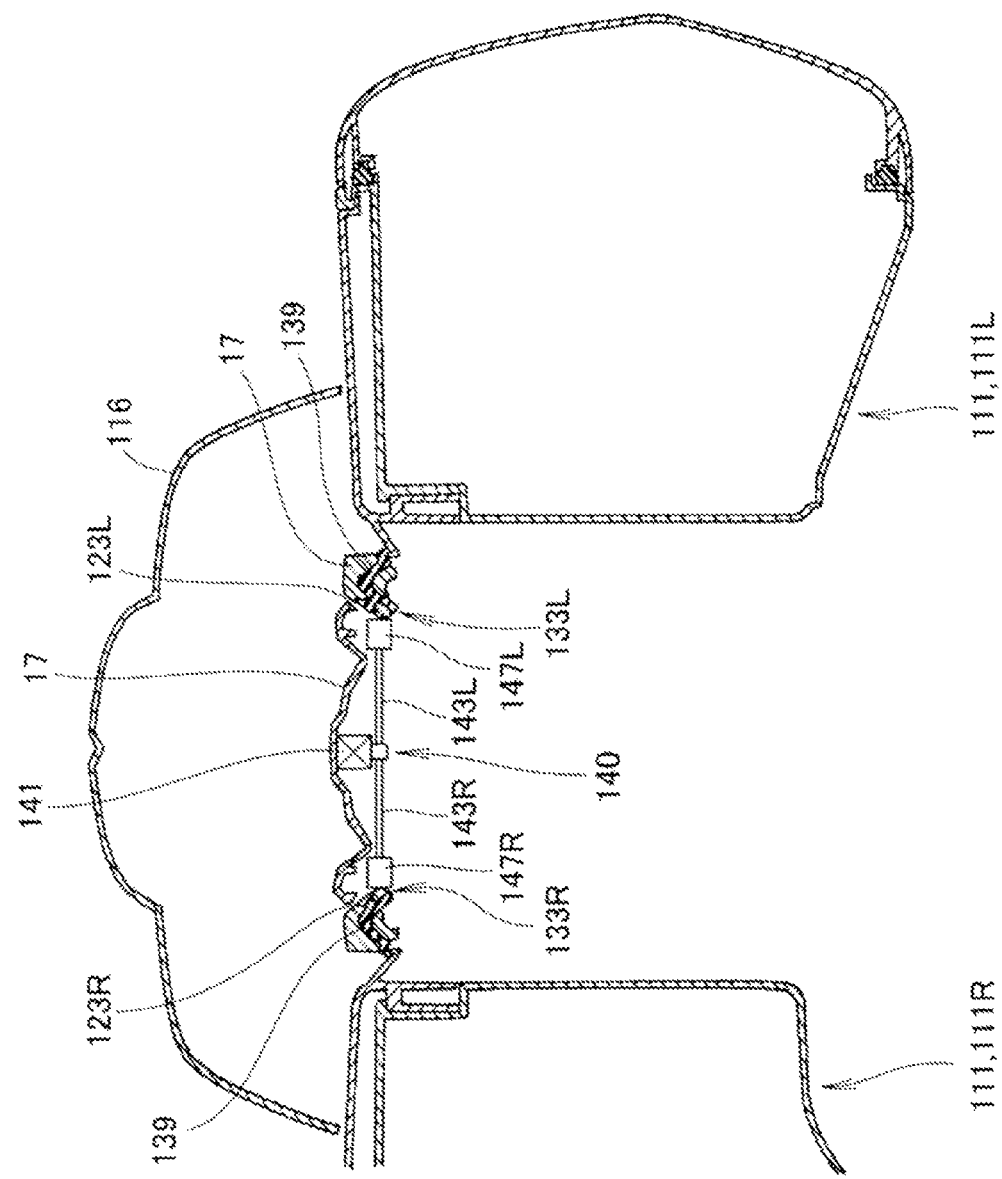
FIG. 6 is a sectional view taken along line 6-6 of FIG. 4.

As shown in FIG. 6, the left and right third saddle bag attachment holes 123L and 123R are provided in the vehicle widthwise direction of the rear fender 17. The left and right third claw portions 133L and 133R provided on the left and right saddle bags 111L and 111R side are engaged with the left and right third saddle bag attachment holes 123L and 123R, respectively. At the engaging locations with the left and right third saddle bag attachment holes 123L and 123R, the elastic members 139 for moderating vibration to be applied to the saddle bags 111L and 111R are provided on the left and right third claw portions 133L and 133R, respectively.

A locking mechanism 140 is provided on the rear fender 17 below the rear fender 17 and retains the left and right saddle bags 111L and 111R so as not to come off from the third saddle bag attachment holes 123L and 123R. A structure of the locking mechanism 140 is described below.

Figure 7A:
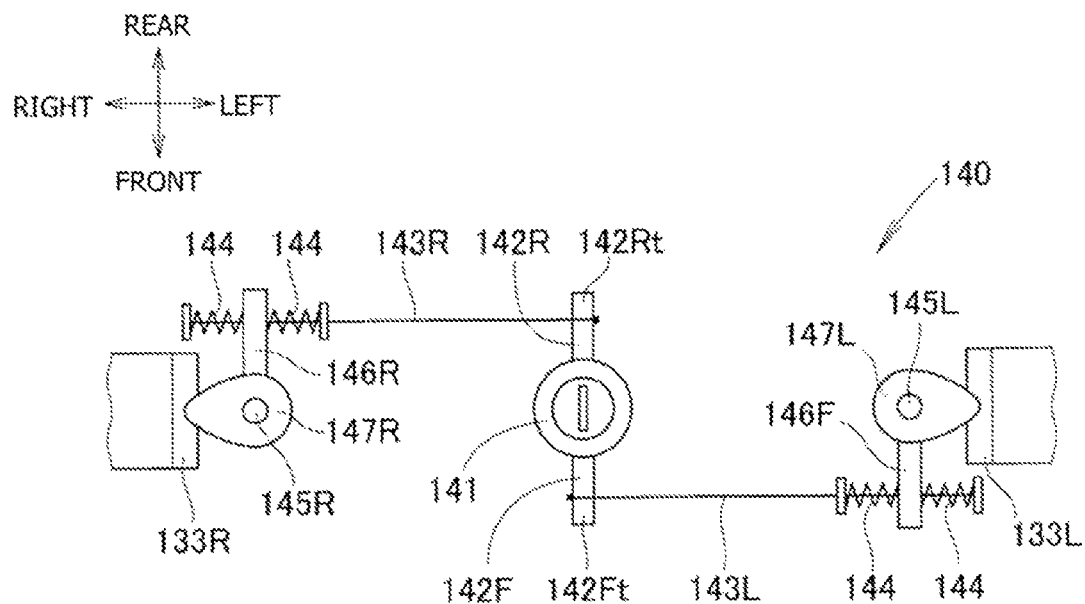
FIGS. 7A and 7B are views depicting a structure and action of a locking mechanism for the saddle bag in FIG. 6.
Figure 7B:
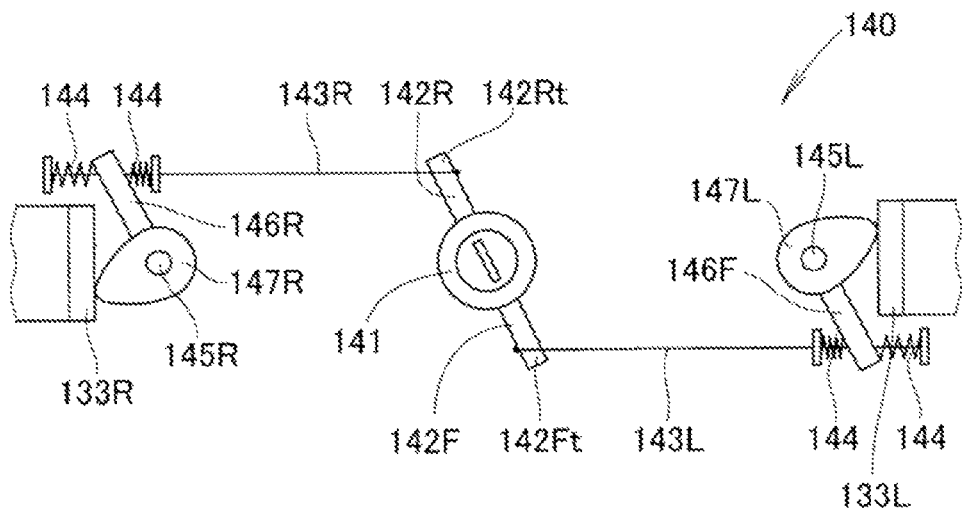

FIG. 7(*a*) is a view showing a structure of the locking mechanism 140 for the left and right saddle bags and illustrating a locked state. FIG. 7(*b*) is a view illustrating an unlocked state of the left and right saddle bags.

As shown in FIG. 7(*a*), the locking mechanism 140 for the left and right saddle bags includes, as principal components thereof, a key cylinder 141, front and rear first arm portions 142F and 142R, left and right connection bars 143L and 143R, front and rear second arm portions 146F and 146R, and left and right cams 147L and 147R. The first arm portions 142F and 142R project forwardly and rearwardly from the key cylinder 141, respectively. The connection bars 143L and 143R extend leftwardly and rightwardly in the vehicle widthwise direction from ends 142Ft and 142Rt of the front and rear first arm portions 142F and 142R, respectively. The second arm portions 146F and 146R are provided for pivotal motion around left and right pivot shafts 145L and are 145R and locked by ends of the left and right connection bars 143L and 143R though springs 144 for buffering, respectively. The cams 147L and 147R rotate integrally with the front and rear second arm portions 146F and 146R, respectively. The left and right cams 147L and 147R control the left and right third claw portions 133L and 133R for abutting from above, respectively. By the control by the cams 147L and 147R, the left and right third claw portions 133L and 133R are prevented from disengaging from the left and right third saddle bag attachment holes 123L and 123R but are retained in the left and right third saddle bag attachment holes 123L and 123R (refer to FIG. 6), respectively.

If the key cylinder 141 is turned in the counterclockwise direction as seen in FIG. 7(*b*), then the front and rear first arm portions 142F and 142R are pivoted in the counterclockwise direction in FIG. 7(*b*) by the turning of the key cylinder 141. The left and right connection bars 143L and 143R extending from the ends of the front and rear first arm portions 142F and 142R extend outwardly in the vehicle widthwise direction. By such extension of the left and right connection bars 143L and 143R, the front and rear second arm portions 146F and 146R are pivoted in the counterclockwise direction around the left and right pivot shafts 145L and 145R, respectively. Thereupon, the left and right cams 147L and 147R integrated with the left and right pivot shafts 145L and 145R are rotated to cancel the control of the left and right third claw portions 133L and 133R from above. In this state, the left and right third claw portions 133L and 133R can be removed from the left and right third saddle bag attachment holes 123L and 123R, respectively. For the locking, the key cylinder 141 may be turned in the clockwise direction. The series of operations for locking and unlocking of the saddle bags is such as described above.

Referring also to FIG. 4, turning of the key cylinder 141 in the counterclockwise direction allows unlocking of the saddle bags 111L and 111R. Meanwhile, turning of the key cylinder 141 in the clockwise direction allows unlocking of the occupant seat 15, causes movement of the occupant seat 15 and opens the rear portion of the vehicle. Further, the luggage hanging hook attachment holes 99L and 99R are provided in the passenger grips 112L and 112R. Therefore, when the gripping portions 92L and 92R are positioned at the upper position as shown in FIG. 2, the luggage hanging hook attachment holes 99L and 99R appear on the outside, respectively. It is to be noted that details of the passenger grips 112L and 112R and peripheral elements are described below.

Now, a structure of the left passenger grip 112L provided for upward and downward sliding movement on the rear cowl 75 and peripheral elements is described. It is to be noted that the structure of the right passenger grip 112R and peripheral elements is left-right symmetrical with respect to the center line in the vehicle widthwise direction, and description of the structure is omitted herein.

Figure 8:
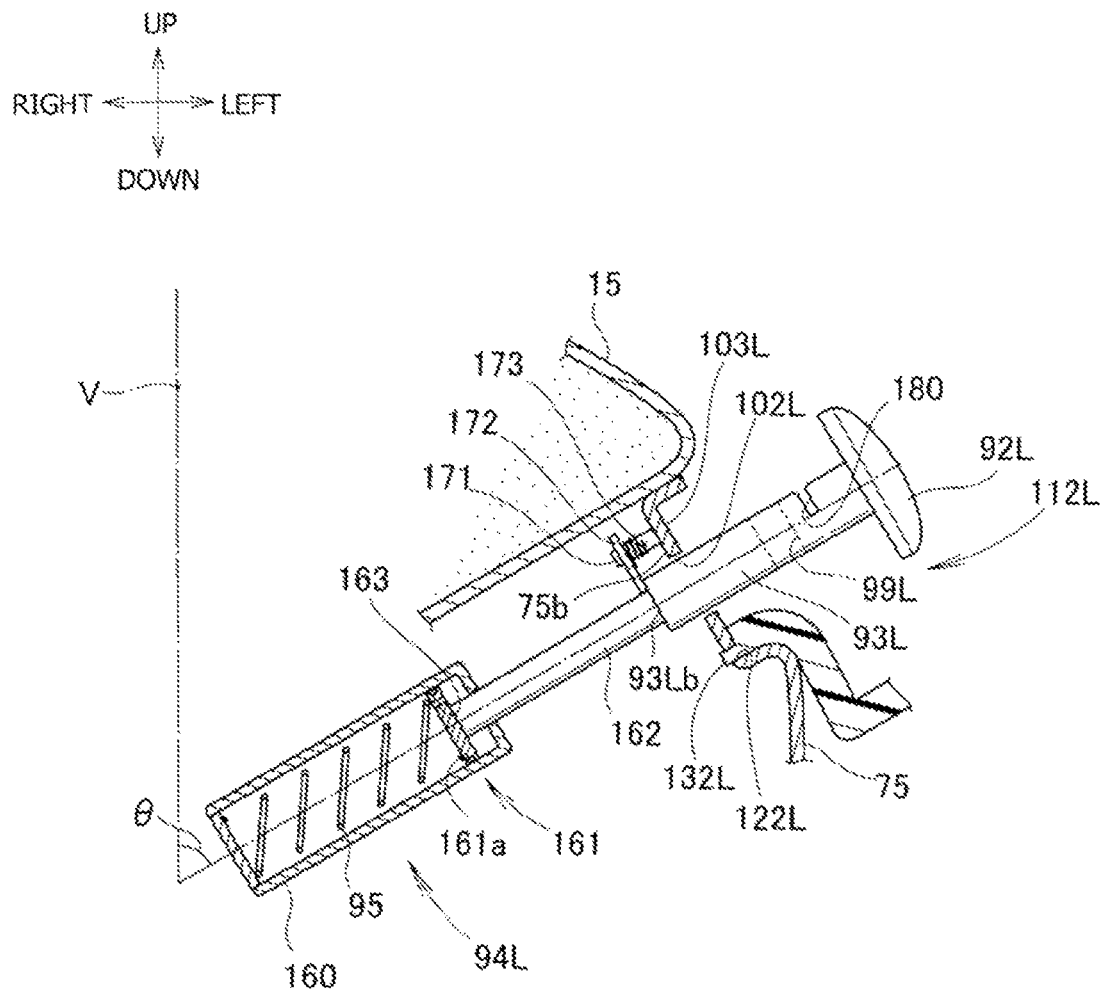
FIG. 8 is a sectional view taken along line 8-8 of FIG. 4.

As shown in FIG. 8, the passenger grip 112L has an expansion and contraction mechanism 94L at a lower end of the column portion 93L which supports the gripping portion 92L which can be gripped by the occupant. The expansion and contraction mechanism 94L supports the passenger grip 112L for expansion and contraction.

The expansion and contraction mechanism 94L is supported on the rear frame 19 (refer to FIG. 4). Accordingly, the passenger grip 112L is supported on the rear frame 19. A passenger grip supporting hole 102L is provided on the rear cowl 75 such that the column portion 93L of the passenger grip 112L is slidably inserted into the passenger grip supporting hole 102L. The column portion 93L of the passenger grip 112L is inserted from above into the passenger grip supporting hole 102L. The passenger grip 112L including the column portion 93L is supported for expansion and contraction from below by the expansion and contraction mechanism 94L.

The direction in which the passenger grip 112L slidably moves from the lower position to the upper position is an obliquely outwardly upward direction in the vehicle widthwise direction. When the passenger grip 112L is at the upper position, the second saddle bag attachment hole 122L is exposed to the outer side of the passenger grip 112L. More particularly, the passenger grip 112L is disposed in an inclined relationship to an obliquely outwardly upper direction by an angle $\Theta$ with respect to a vertical line V.

A left recessed portion 103L is formed on the top face of the rear cowl 75 at the position at which the passenger grip 112L is fitted. The left second saddle bag attachment hole 122L is provided at an outer end portion of the left recessed portion 103L in the vehicle widthwise direction.

The expansion and contraction mechanism 94L includes a case main body 160, a hydraulic damper member 161 and a spring 95, and a slider member 162 as principal components thereof. The hydraulic damper member 161 includes a piston 161a accommodated in the case main body 160. The slider member 162 is in the form of a rod extending from the piston 161a and connected to a lower end of the column portion 93L. An orifice 163 is provided on the piston 161a, and oil is filled in the case main body 160.

By the configuration described above, the passenger grip 112L is supported for movement in the axial direction of the column portion 93L on the rear cowl 75. In FIG. 8, the spring 95 is shown in a released state and the expansion and contraction mechanism 94L is in an extended state. At this time, the passenger grip 112L is at the upper position, and the occupant can grip the passenger grip 112L. In addition, the second claw portion 132L of the saddle bag engages with the second saddle bag attachment hole 122L. Furthermore, the luggage hanging hook attachment hole 99L provided on the column portion 93L appears on the outside. It is to be noted that the lower end 93Lb of the column portion 93L is supported against sliding movement by a passenger grip locking mechanism 170.

Now, a structure and operation of the passenger grip locking mechanism 170 which locks and retains the passenger grip 112L at the upper position (use position) or the lower position (retracted position) are described.

Figure 9A:
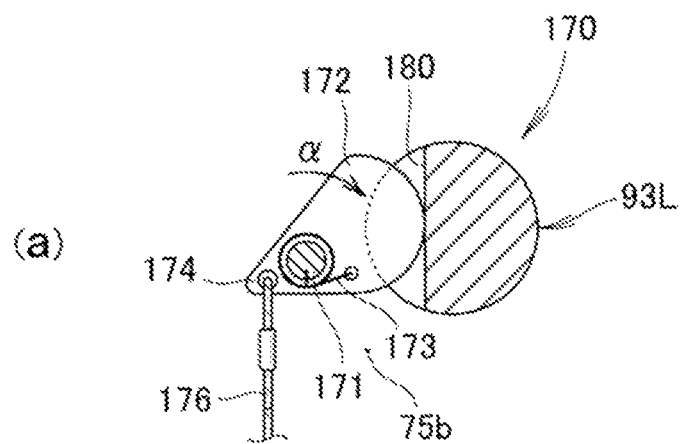
FIGS. 9A and 9B are views depicting a structure and action of a passenger grip locking mechanism.
Figure 9B:
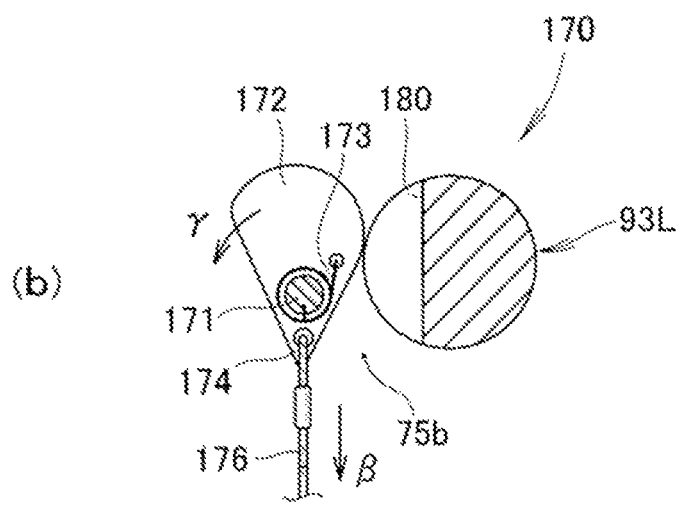

FIG. 9(a) is a view illustrating a structure and a locking state of the passenger grip locking mechanism and corresponds to a position of a cam stopper 172 of FIG. 10 hereinafter described. FIG. 9(b) is a view illustrating an unlocking state of the passenger grip locking mechanism.

Referring to FIG. 9(a), the passenger grip locking mechanism 170 includes a shaft portion 171, the cam stopper 172, a spring 173 and a wire 176 as principal components thereof. The shaft portion 171 is attached to a lower face 75b of the rear cowl 75. The cam stopper 172 is provided for pivotal motion on the shaft portion 171. The spring 173 is fitted on the shaft portion 171 and biases the cam stopper 172 in a locking direction, which is an α direction in FIG. 9(a), around the shaft portion 171. The wire 176 is attached to a position 174 of the cam stopper 172 spaced from the shaft portion 171. The wire 176 is connected to the key cylinder 141 (refer to FIG. 7) described hereinabove and belongs to a system different from that of the connection bars 143L and 143R (refer to FIG. 7). That is, the cam stopper 172 can be pivoted by turning motion of the key cylinder 141.

Referring to FIG. 9(b), if the key cylinder 141 is turned to draw the wire 176 in a β direction, then the cam stopper 172 is pivoted in an unlocking direction, which is a γ direction in FIG. 9(b), around the shaft portion 171. Thus, in FIG. 9(b), the passenger grip locking mechanism 170 is shown transiting from the locking position to the unlocking position. If the drawing force to urge the wire 176 in the β direction in FIG. 9(b) is removed, then the position of FIG. 9(a) is restored by an action of the spring 173.

Now, operation when the left second claw portion 132L is removed from the left second saddle bag attachment hole 122L to lock the passenger grip 112L at the lower position is described.

Figure 10:
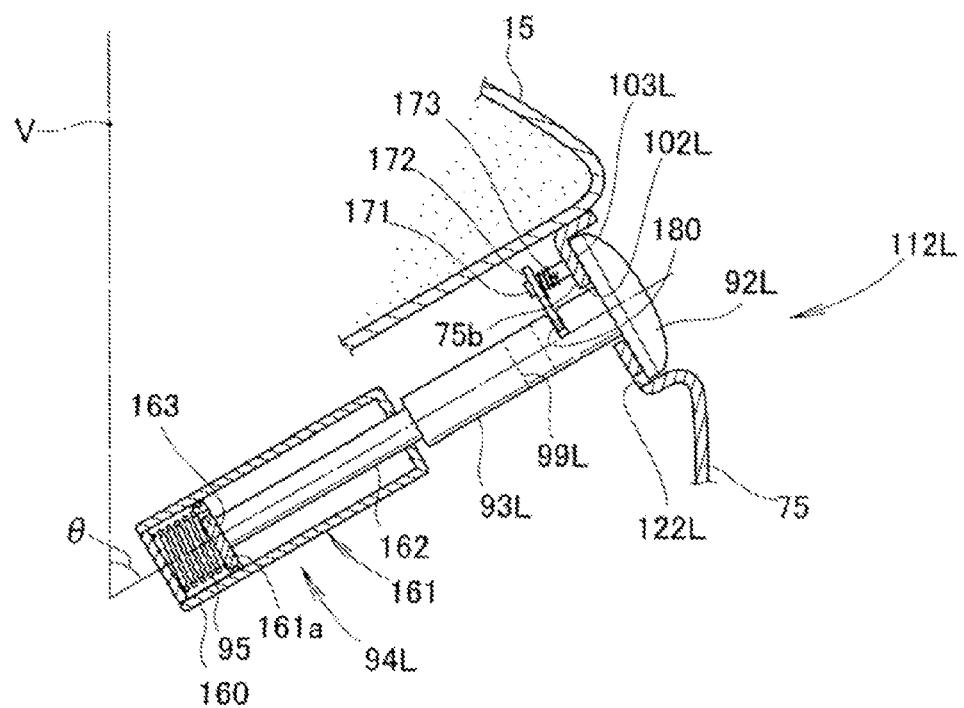
FIG. 10 is a view illustrating an action of parts shown in FIG. 8.

As shown in FIG. 10, if the left second claw portion 132L is removed and the gripping portion 92L of the passenger grip 112L is slidably moved downwardly into the recessed portion 103L to move the passenger grip 112L to the lower position, then the left second saddle bag attachment hole 122L is closed up. At this time, the cam stopper 172 of the passenger grip locking mechanism 170 is engaged with a recessed portion 180 formed on the column portion 93L to retain the passenger grip 112L at the lower position on the rear cowl 75. When the left second claw portion 132L is to be attached, the passenger grip locking mechanism 170 described hereinabove with reference to FIG. 9 is operated into the unlocking state. As a result of the operation of the passenger grip locking mechanism 170, the passenger grip 112L can be moved to the upper position by an action of the spring 95. The series of operations of the slidably moving mechanism for the passenger grip is such as described above.

Referring to FIG. 8, when the left second claw portion 132L is to be attached through the left second saddle bag attachment hole 122L, since the left second saddle bag attachment hole 122L is exposed to the outer side of the passenger grip 112L, the operability in mounting and dismounting of the left second claw portion 132L provided on the saddle bag side can be enhanced. In addition, the luggage hanging hook attachment hole 99L provided on the passenger grip 112L appears on the outside only when the passenger grip 112L is at the upper position. However, when the passenger grip 112L is not used, the luggage hanging hook attachment hole 99L can be brought out of sight from the outside by placing the passenger grip 112L to the lower position. As a result, the appearance of the rear part of the vehicle can be enhanced.

Now, a pivoting structure for the passenger step 58L which can close up the first saddle bag attachment hole 121L is described. Although, in the following description, the passenger step 58L on the left side in the vehicle widthwise direction and peripheral elements are described, the structure of the passenger step 58R (refer to FIG. 4) on the right side in the vehicle widthwise direction and peripheral elements is symmetrical with respect to the center line in the vehicle widthwise direction. Therefore, description of the structure is omitted herein.

Figure 11:
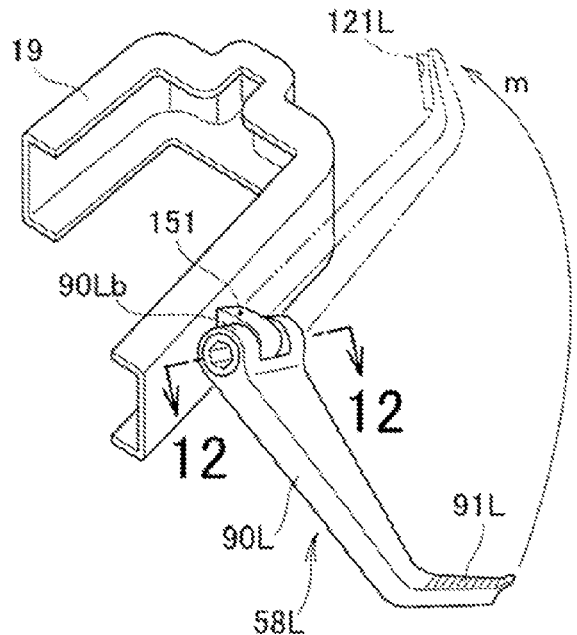
FIG. 11 is a perspective view illustrating a pivoting mechanism for a pillion step.

Referring to FIG. 11, the passenger step 58L is attached to an attachment projection 151 formed in a projecting manner on the outer side face of the rear frame 19. When the passenger step 58L is pivoted in the direction indicated by an arrow mark m until the passenger step 58L is retracted (accommodated) into the rear cowl 75 (refer to FIG. 1), the foot receiving portion 91L on which the passenger is to place its foot covers the first saddle bag attachment hole 121L. The passenger step 58L is configured from an arm portion 90L and the foot receiving portion 91L provided at the end of the arm portion 90L. The arm portion 90L is supported at a base portion thereof for pivotal motion on the attachment projection 151.

Now, a detailed structure of the attachment projection 151 provided on the rear frame 19 and peripheral elements is described.

Figure 12:
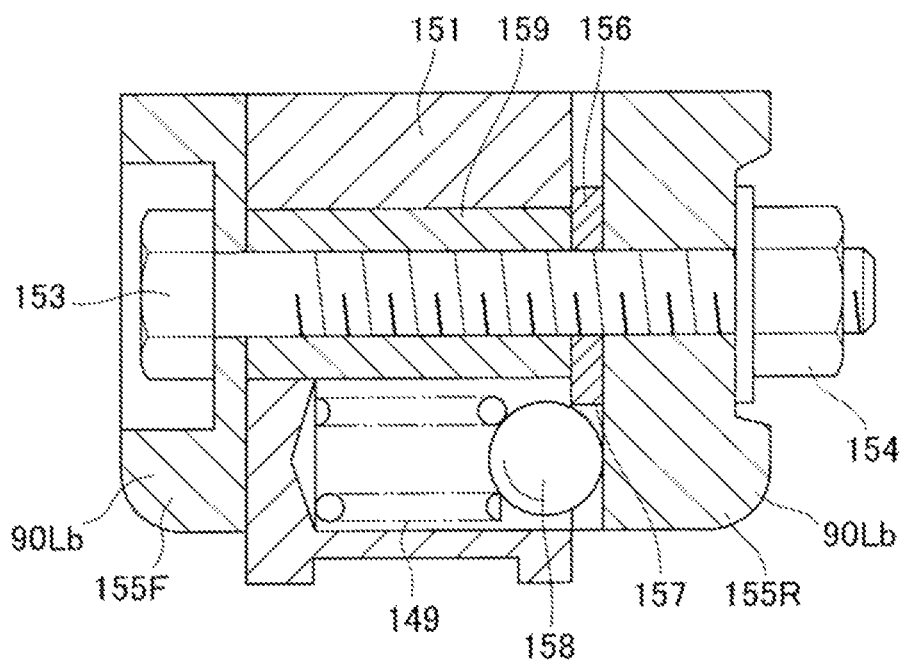
FIG. 12 is a sectional view taken along line 12-12 of FIG. 11.

Referring to FIG. 12, a base portion 90Lb of the arm portion 90L is provided for pivotal motion through a bolt 153, which serves as a pivot shaft, and a nut 154 on the attachment projection 151. The base portion 90Lb of the arm portion 90L has a pair of boss portions 155F and 155R provided so as to sandwich the attachment projection 151 therebetween and oppose to each other. A plate-like locking plate 156 is provided for integral pivotal motion on the boss portions 155F and 155R. A locking groove 157 is formed at part of the locking plate 156. As a locking ball 158 provided on the attachment projection 151 side is fitted into the locking groove 157, the passenger step 58L can be locked at a predetermined angle at the upper position (retracted position) and the lower position (use position). Reference symbol 159 denotes a collar member fitted between the bolt 153 and the attachment projection 151.

The locking ball 158 is biased to project in a locking direction by a spring member 149 such as a coil spring. If the locking groove 157 is moved to a location above the locking ball 158, then the locking ball 158 is projected into and locked by the locking groove 157. In the locking plate 156, the locking groove 157 is formed over an angle corresponding to the use position and the accommodation position. If torque equal to or higher than predetermined torque is applied, then the passenger step 58L can be pivotally moved so as to be retained.

Action of the rear portion structure of a vehicle described above is described below.

Referring to FIGS. 2 to 4, the saddle bags 111L and 111R are removably attached to the rear frame 19, rear cowl 75 and/or rear fender 17. Further, the saddle bag attachment holes 121L, 121R, 122L and 122R to which the saddle bags 111L and 111R are attached are covered with the movable members 100 when the saddle bags 111L and 111R are not attached to the vehicle. When the saddle bags 111L and 111R are not attached, since the saddle bag attachment holes 121L, 121R, 122L and 122R are covered with the movable members 100, the saddle bag attachment holes 121L, 121R, 122L and 122R can be hidden. Consequently, the appearance of the vehicle can be enhanced.

Further, since the movable members 100 are components of the vehicle body having other functions, different members for covering the saddle bag attachment holes 121L, 121R, 122L and 122R need not be provided. Consequently, the number of parts can be decreased.

In particular, the passenger steps 58L and 58R which are components of the movable members 100 are attached for pivotal motion to the rear frame 19. When the passenger steps 58L and 58R are retracted, the first saddle bag attachment holes 121L and 121R are covered with the passenger steps 58L and 58R, respectively. When the saddle bags 111L and 111R are not attached, the first saddle bag attachment holes 121L and 121R are covered with the passenger steps 58L and 58R, respectively. Therefore, the first saddle bag attachment holes 121L and 121R can be hidden. Consequently, the appearance of the vehicle can be enhanced.

Further, the passenger steps 58L and 58R have the foot receiving portions 91L and 91R, respectively. When the passenger steps 58L and 58R are retracted in the rear cowl 75, the first saddle bag attachment holes 121L and 121R are covered with the foot receiving portions 91L and 91R of the passenger steps 58L and 58R, respectively. Since the first saddle bag attachment holes 121L and 121R are covered with the foot receiving portions 91L and 91R, respectively, the first saddle bag attachment holes 121L and 121R are not exposed. Consequently, the appearance of the vehicle can be enhanced.

Referring to FIG. 4, the saddle bag attachment holes 121L, 122L, 121R and 122R provided on the left and right sides individually at two places are hidden by the occupant seat 15 as viewed in top plan of the vehicle. Since the first saddle bag attachment holes 121L and 121R and the second saddle bag attachment holes 122L and 122R are hidden by the occupant seat 15, the appearance of the vehicle can be enhanced.

Referring to FIGS. 8 to 10, the passenger grips 112L and 112R which are the movable members 100 are provided for sliding movement on the rear cowl 75. When the passenger grips 112L and 112R are at the lower position, the second saddle bag attachment holes 122L and 122R are covered with the passenger grips 112L and 112R, respectively. When the saddle bags 111L and 111R are not attached, the second saddle bag attachment holes 122L and 122R are covered with the passenger grips 112L and 112R, respectively. Therefore, the second saddle bag attachment holes 122L and 122R can be hidden. Consequently, the appearance of the vehicle can be enhanced.

Further, the passenger grips 112L and 112R configure part of the rear cowl 75. In particular, since part of the rear cowl 75 is used as the passenger grips 112L and 112R, the number of parts can be decreased. Further, when the passenger grips 112L and 112R are at the upper position to which they are slidably moved in an outwardly obliquely upward direction in the vehicle widthwise direction, the second saddle bag attachment holes 122L and 122R are exposed to the outer sides of the passenger grips 112L and 112R, respectively. Since the second saddle bag attachment holes 122L and 122R are positioned on the outer sides of the passenger grips 112L and 112R, the working performance in attachment of the saddle bags 111L and 111R can be enhanced.

Referring to FIGS. 2 and 3, the saddle bag attachment holes 121L, 122L, 121R and 122R provided on the rear cowl 75 on the left and right sides individually at two places are covered with the movable members 100. The first and second saddle bag attachment holes 121L, 122L, 121R and 122R on the left and right sides individually at two places are individually covered with the movable members 100. Therefore, the number of covered saddle bag attachment holes 121L, 122L, 121R and 122R increases. Consequently, the appearance of the vehicle can be enhanced still further.

It is to be noted that, although, in the present embodiment, the present invention is applied to a motorcycle, it can be applied also to a three-wheeled vehicle and there is no problem if the present invention is applied to general vehicles.

The present invention is suitable for use with a motorcycle having a structure in which a saddle bag can be attached to a vehicle rear portion.

We claim:

1. A rear portion structure of a vehicle, comprising:
a rear frame disposed at a rear portion of a vehicle body;
a rear fender provided below said rear frame and configured to cover a rear wheel;
a rear cowl provided on sides of said rear frame and configured to cover said rear frame;
an occupant seat provided above said rear fender such that a driver and a passenger can be seated forward and backward thereon; and
at least one saddle bag removably provided as a storage compartment on at least one of said rear frame, said rear cowl and said rear fender,
wherein saddle bag attachment holes are provided on at least one of said rear frame, said rear cowl and said rear fender, and are configured to attach said at least one saddle bag thereto,
wherein claw portions are provided on said at least one saddle bag and are configured to engage with said saddle bag attachment holes to attach said at least one saddle bag,
wherein when said at least one saddle bag is not attached to the vehicle, said saddle bag attachment holes are coverable by movable members provided on the vehicle, and
wherein said movable members are components of the vehicle body which have a function other than a function of covering said saddle bag attachment holes, wherein the function other than the function of covering said saddle bag attachment holes includes providing (i) at least one passenger step on which the passenger can place a foot thereof, (ii) at least one passenger grip which can be gripped by the driver or the passenger, or (iii) at least one passenger step on which the passenger can place a foot thereof and at least one passenger grip which can be gripped by the driver or the passenger.

2. The rear portion structure for a vehicle according to claim 1,
wherein said at least one passenger step is pivotally attached to said rear frame and is retractable into said cowl, and
wherein when said at least one passenger step is retracted into said rear cowl, said at least one passenger step covers said saddle bag attachment holes.

3. The rear portion structure for a vehicle according to claim 2,
wherein said at least one passenger step comprises an arm portion and a foot receiving portion provided at an end of said arm portion, such that the passenger can place a foot thereof on said foot receiving portions,
wherein a base portion of said arm portion is supported for pivotal motion on said rear frame, and
wherein when said at least one passenger step is retracted in said rear cowl, said foot receiving portion covers one of said saddle bag attachment holes.

4. The rear portion structure for a vehicle according to claim 1,
wherein said at least one passenger grip is provided at an upper location of said rear cowl for sliding movement between an upper position and a lower position,
wherein when said at least one passenger grip is at the upper position, at least one of said saddle bag attachment holes is exposed, and
wherein when said at least one passenger grip is at the lower position, said at least one of said saddle bag attachment holes is covered with said at least one passenger grip.

5. The rear portion structure for a vehicle according to claim 4,
wherein said at least one passenger grip forms part of said rear cowl,
wherein a direction in which said at least one passenger grip slidably moves from the lower position to the upper position is an outwardly obliquely upward direction, in a vehicle widthwise direction, and
wherein when said at least one passenger grip is at the upper position, said at least one of said saddle bag attachment holes is exposed to outer sides of said at least one passenger grip.

6. The rear portion structure for a vehicle according to claim 1,
wherein said saddle bag attachment holes are symmetrically provided on left and right sides of said rear fender at one position and are symmetrically provided on left and right sides of said rear cowl or said rear frame at two positions, and
wherein said saddle bag attachment holes symmetrically provided on the left and right sides of said rear cowl or said rear frame at said two positions are coverable by said movable members.

7. The rear portion structure for a vehicle according to claim 2,
wherein said saddle bag attachment holes are symmetrically provided on left and right sides of said rear fender at one position and are symmetrically provided on left and right sides of said rear cowl or said rear frame at two positions, and
wherein said saddle bag attachment holes symmetrically provided on the left and right sides of said rear cowl or said rear frame at said two positions are coverable by said movable members.

8. The rear portion structure for a vehicle according to claim 3,
wherein said saddle bag attachment holes are symmetrically provided on left and right sides of said rear fender at one position and are symmetrically provided on left and right sides of said rear cowl or said rear frame at two positions, and
wherein said saddle bag attachment holes symmetrically provided on the left and right sides of said rear cowl or said rear frame at said two positions are coverable by said movable members.

9. The rear portion structure for a vehicle according to claim 4,
wherein said saddle bag attachment holes are symmetrically provided on left and right sides of said rear fender at one position and are symmetrically provided on left and right sides of said rear cowl or said rear frame at two positions, and
wherein said saddle bag attachment holes symmetrically provided on the left and right sides of said rear cowl or said rear frame at said two positions are coverable by said movable members.

10. The rear portion structure for a vehicle according to claim 5,
wherein said saddle bag attachment holes are symmetrically provided on left and right sides of said rear fender at one position and are symmetrically provided on left and right sides of said rear cowl or said rear frame at two positions, and
wherein said saddle bag attachment holes symmetrically provided on the left and right sides of said rear cowl or said rear frame at said two positions are coverable by said movable members.

11. The rear portion structure for a vehicle according to claim 6,
wherein said saddle bag attachment holes are symmetrically provided on the left and right sides of said rear cowl at two positions, and
wherein, among said saddle bag attachment holes symmetrically provided on the left and right sides of said rear cowl at two positions, saddle bag attachment holes on at least one of the left and right sides are hidden by said occupant seat, as viewed in top plan of the vehicle.

12. The rear portion structure for a vehicle according to claim 7,
wherein said saddle bag attachment holes are symmetrically provided on the left and right sides of said rear cowl at two positions, and
wherein, among said saddle bag attachment holes symmetrically provided on the left and right sides of said rear cowl at two positions, saddle bag attachment holes on at least one of the left and right sides are hidden by said occupant seat, as viewed in top plan of the vehicle.

13. The rear portion structure for a vehicle according to claim 8,
wherein said saddle bag attachment holes are symmetrically provided on the left and right sides of said rear cowl at two positions, and
wherein, among said saddle bag attachment holes symmetrically provided on the left and right sides of said rear cowl at two positions, saddle bag attachment holes on at least one of the left and right sides are hidden by said occupant seat, as viewed in top plan of the vehicle.

14. The rear portion structure for a vehicle according to claim 9,
wherein said saddle bag attachment holes are symmetrically provided on the left and right sides of said rear cowl at two positions, and
wherein, among said saddle bag attachment holes symmetrically provided on the left and right sides of said rear cowl at two positions, saddle bag attachment holes on at least one of the left and right sides are hidden by said occupant seat, as viewed in top plan of the vehicle.

15. The rear portion structure for a vehicle according to claim 10,
wherein said saddle bag attachment holes are symmetrically provided on the left and right sides of said rear cowl at two positions, and
wherein, among said saddle bag attachment holes symmetrically provided on the left and right sides of said rear cowl at two positions, saddle bag attachment holes on at least one of the left and right sides are hidden by said occupant seat, as viewed in top plan of the vehicle.

* * * * *